US010337658B2

(12) United States Patent
Sochtig et al.

(10) Patent No.: US 10,337,658 B2
(45) Date of Patent: Jul. 2, 2019

(54) PART INSERTABLE INTO A PIPE SECTION USING A PRESS-FIT CONNECTION

(71) Applicant: Neoperl GmbH, Mullheim (DE)

(72) Inventors: Michael Sochtig, Neuenburg (DE); Simon Twitchett, Kidderminster (GB)

(73) Assignee: NEOPERL GMBH, Mullheim (DE)

( * ) Notice: Subject to any disclaimer, the term of this patent is extended or adjusted under 35 U.S.C. 154(b) by 126 days.

(21) Appl. No.: 15/541,892

(22) PCT Filed: Jan. 20, 2016

(86) PCT No.: PCT/EP2016/000099
§ 371 (c)(1),
(2) Date: Jul. 6, 2017

(87) PCT Pub. No.: WO2016/142021
PCT Pub. Date: Sep. 15, 2016

(65) Prior Publication Data
US 2018/0003329 A1  Jan. 4, 2018

(30) Foreign Application Priority Data
Mar. 9, 2015  (DE) .................... 20 2015 001 883 U

(51) Int. Cl.
| E03C 1/08 | (2006.01) |
| F16L 55/027 | (2006.01) |
| F16L 55/11 | (2006.01) |
| E03C 1/04 | (2006.01) |
| E03C 1/02 | (2006.01) |

(52) U.S. Cl.
CPC ............ *F16L 55/11* (2013.01); *E03C 1/0409* (2013.01); *E03C 2001/026* (2013.01)

(58) Field of Classification Search
CPC .................. F16L 55/027; E03C 1/0409; E03C 2001/026; E03C 1/08; E03C 1/104
USPC ...... 138/45, 46, 43; 239/530, 525, 571, 570, 239/590, 590.5
See application file for complete search history.

(56) References Cited

U.S. PATENT DOCUMENTS

| 6,571,831 B1* | 6/2003 | Hart ....................... G05D 7/012 138/45 |
| 6,705,549 B2* | 3/2004 | Nakamura ............ B05B 1/3006 239/428.5 |
| 7,543,763 B1* | 6/2009 | Wu ....................... B05B 1/3006 138/45 |
| 9,267,272 B2* | 2/2016 | Schnell ................. E03C 1/0409 |

(Continued)

FOREIGN PATENT DOCUMENTS

WO       2011157309       12/2011

*Primary Examiner* — Patrick F Brinson
(74) *Attorney, Agent, or Firm* — Volpe and Koenig, P.C.

(57) ABSTRACT

The invention relates to an insertable plumbing element (1) that can be inserted, by means of a sleeve-shaped insertion plug (2), into an end-located insertion opening in a plumbing pipe section, which insertion plug (2) has, at least on the outer circumference, an outer layer (3) of elastic material for securing it by frictional engagement in the insertion opening. It is characteristic of the insertable element according to the invention that a reinforcing sleeve (4), which is composed of a material that is inflexible in comparison with the outer layer and which is surrounded by the outer layer (3), is provided to reinforce the outer layer (3) transversely to the plug longitudinal axis.

14 Claims, 5 Drawing Sheets

(56) References Cited

U.S. PATENT DOCUMENTS

| | | | |
|---|---|---|---|
| 9,464,418 B2* | 10/2016 | Schnell | ............... E03C 1/0409 |
| 2003/0006315 A1 | 1/2003 | Nakamura | |
| 2013/0087637 A1* | 4/2013 | Schnell | ............... E03C 1/0409 |
| | | | 239/428.5 |

* cited by examiner

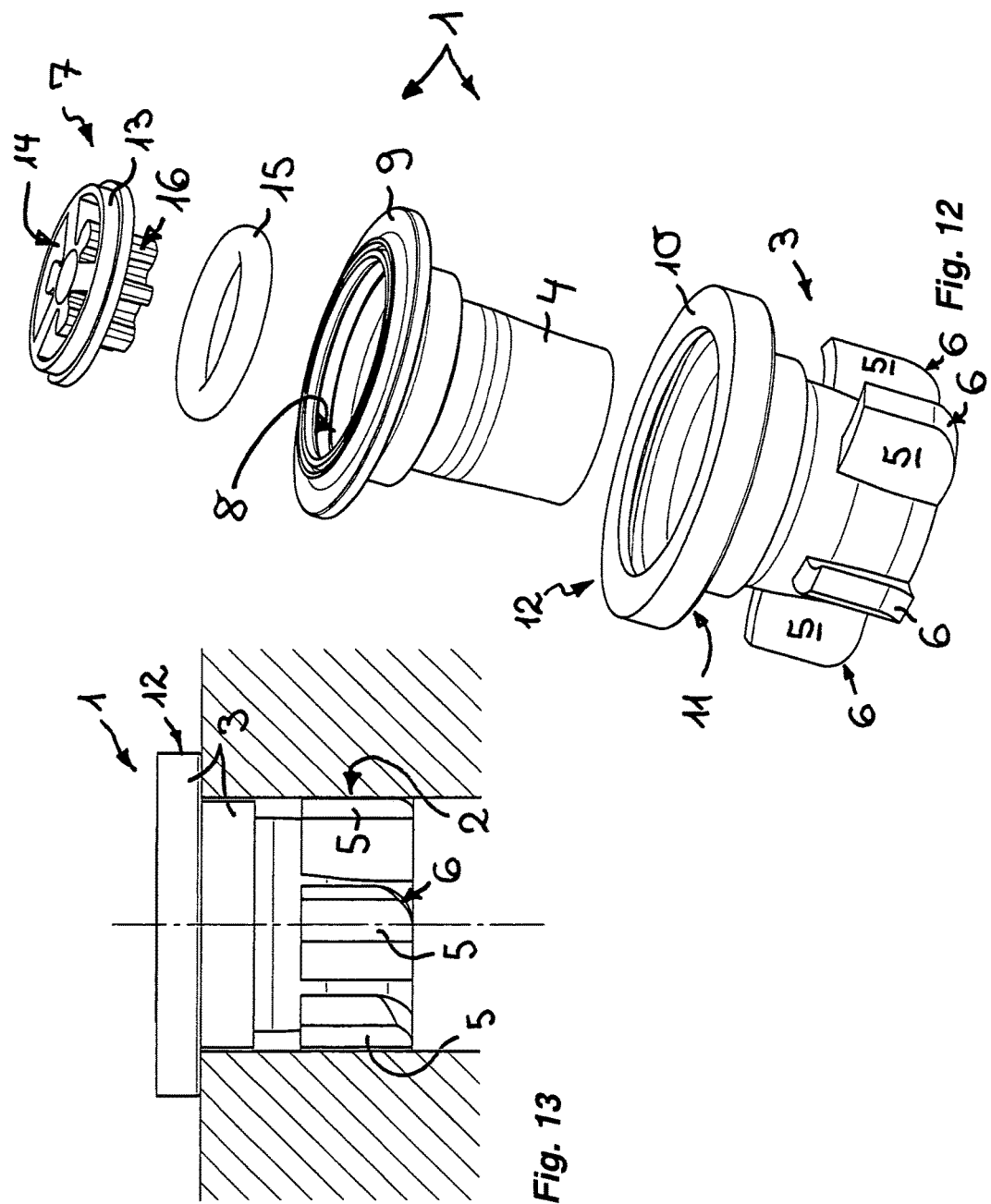

PART INSERTABLE INTO A PIPE SECTION USING A PRESS-FIT CONNECTION

BACKGROUND

The invention relates to an insertable plumbing element that can be inserted, by means of a sleeve-shaped insertion plug, into an end-located insertion opening in a plumbing pipe section, which insertion plug has, at least on the outer circumference, an outer layer of elastic material for securing it by frictional engagement in the insertion opening.

WO 2011/157309 A1 has already disclosed an insertable plumbing element which has a partial region in the form of a sealing ring, on which a sleeve-shaped insertion plug is formed. The previously known insertable element can be inserted into an end-located insertion opening in a plumbing pipe section until the partial region in the form of a sealing ring rests on the inflow-side front edge of said pipe section. The sleeve-shaped insertion plug is produced entirely from an elastic material beyond an outer circumference, thus allowing the insertable element to be held by frictional engagement in the insertion opening. The region of the insertable element in the form of a sealing ring surrounds the disk-shaped regulator housing of a flow rate regulator, which in its regulator housing has a ring-shaped channel in which a ring-shaped restriction element composed of elastic material is arranged, which bounds a between itself and a regulating profile provided on an inner and/or an outer channel wall, said being variable by means of the restrictor element, which is deformed under the pressure of the inflowing water. To enable the previously known insertable element to be inserted into the different clear diameters of the various insertion openings and to enable the insertable element to adapt well to these different clear diameters, a plurality of retaining fins arranged in a manner distributed over the plug circumference is provided on the insertion plug. These retaining fins can come to rest in a propeller shape on the outer circumference of the retaining plug when the insertable element is to be inserted into an insertion opening that has a relatively small clear diameter. This relatively small clear diameter is restricted even more by the comparatively thick diameter of the retaining plug, and this is noticeable from a relatively poor, i.e. low, flow rate, especially at low pressures.

SUMMARY

It is therefore, in particular, the object to provide an insertable plumbing element of the type mentioned at the outset which can be mounted securely and firmly in the insertion opening of a plumbing pipe section by means of its insertion plug and which, at the same time, is also distinguished by an increased flow volume, even at low pressures.

In the case of the insertable plumbing element of the type mentioned at the outset, the solution according to the invention consists, in particular, in that a reinforcing sleeve, which is composed of a material that is inflexible in comparison with the outer layer and which is surrounded by the outer layer, is provided to reinforce the outer layer transversely to the plug longitudinal axis.

The insertable plumbing element according to the invention has a sleeve-shaped insertion plug, by means of which the insertable element can be inserted into an end-located insertion opening in a plumbing pipe section. To secure it by frictional engagement in the insertion opening, this insertion plug has, at least on the outer circumference, an outer layer of elastic material. In order to sufficiently reinforce, in a direction transverse to the plug longitudinal axis, even a relatively thin outer layer that does not significantly impair the clear flow cross section through the sleeve-shaped insertion plug, especially at low pressures, so as to ensure that the elastic material of the outer layer is pressed against the inner circumference of the pipe and the insertion plug can be held there securely and firmly, a reinforcing sleeve, which is composed of a material that is inflexible in comparison with the outer layer and which is surrounded by the outer layer, is provided. To achieve a higher flow rate in the low pressure range, larger cross sections are required. To achieve this, however, the wall thickness of the sleeve-shaped insertion plug must be reduced. However, this wall thickness cannot be reduced arbitrarily because otherwise the elastic material of the insertion plug would collapse as it was pressed into the end-located opening in a pipe section, with the result that the insertion plug could no longer transmit the desired contact pressure. The insertable element according to the invention therefore has a reinforcing sleeve composed of inflexible material, which is surrounded by the elastic outer layer. This reinforcing sleeve ensures that the elastic material of the outer layer provided on the outer circumference can always transmit an appropriate pressure to the circumferential wall of the pipe section.

To enable the insertion plug to be inserted into different insertion openings that differ from one another in a relatively large cross-sectional range and to enable the insertion plug to compensate well for the corresponding differences in diameter, it is advantageous if at least one retaining fin composed of elastic material is held and preferably formed integrally on the outer layer, said fin projecting beyond the insertion plug transversely to the plug longitudinal axis.

In order to center the insertion plug as the insertable element according to the invention is inserted and its insertion plug is pressed into the end-located insertion opening in a plumbing pipe section, it is advantageous if at least two and preferably more than two retaining fins project from the outer layer, said fins being arranged in a manner distributed in a circumferential direction of the insertion plug, preferably at uniform intervals.

The retaining fins projecting from the insertion plug transversely to the plug longitudinal axis can adapt particularly well to the different diameters of various insertion openings if the at least one retaining fin has a bent fin cross section.

To ensure that the retaining fins do not obstruct one another when the insertion plug is pressed into a relatively small insertion opening, it is advantageous if the fin cross sections of the retaining fins are bent in the same circumferential direction.

In order to be able to sufficiently deflect and bend the retaining fins composed of elastic material even during the insertion of the insertion plug, it is advantageous if that end edge region of the at least one retaining fin which is at the front in the insertion direction of the insertion plug widens to an increasing extent in the insertion direction.

A preferred embodiment according to the invention envisages that a flow restrictor that reduces the flow or a flow rate regulator that regulates the flow volume flowing through per unit time to a pressure-independent defined flow value is provided at least on one end region of the reinforcing sleeve and preferably at least on the inflow-side end region thereof.

Here, a preferred embodiment according to the invention envisages that the reinforcing sleeve has a flow-restrictor or flow-rate-regulator receptacle, at least at its inflow-side end region, into which receptacle a flow restrictor or a flow rate regulator can be inserted.

In order to limit the insertion travel of the insertion plug to a sufficient amount as it is inserted into an end-located insertion opening in a pipe section, it is advantageous if the reinforcing sleeve has at one end thereof an insertion stop designed as a ring-shaped flange on the outer circumference.

It is possible for the outer layer and the reinforcing sleeve to be produced as two- or multi-component injection moldings.

A preferred embodiment according to the invention envisages that the outer layer is pushed onto the reinforcing sleeve, which is produced separately from said layer.

In certain uses, it may be sufficient if the outer layer surrounds the reinforcing sleeve up to the insertion stop thereof. Another embodiment according to the invention envisages that the outer layer surrounds the reinforcing sleeve beyond the insertion stop thereof and that the insertion stop surrounded by the outer layer is designed as a sealing ring, which can be clamped between adjacent ends of two interconnected pipe sections, for example.

It is advantageous here if an end region of the outer layer is designed as a ring-shaped flange formed by two ring-shaped zones of the material layers connected to one another at the edges, and if the ring-shaped zones, which are connected at the outer circumferential edge thereof, enclose the insertion stop of the reinforcing sleeve between them.

In order to be able to equip the insertable element according to the invention with a flow rate regulator and in order to be able to produce this flow rate regulator in a manner which is as simple as possible, it is advantageous if the flow rate regulator has a regulator housing having at least one ring-shaped channel, in which channel a ring-shaped restrictor element composed of elastic material is provided, which bounds a control gap between itself and a regulating profile provided on the inner and/or the outer channel wall, said gap being variable by means of the restrictor element, which is deformed under the pressure of the fluid flowing through.

BRIEF DESCRIPTION OF THE DRAWINGS

Further features of the invention will become apparent from the claims in conjunction with the drawing and the description. The invention is described in greater detail below by means of particularly advantageous illustrative embodiments.

In the drawings:

FIG. 12 shows the insertable element from FIGS. 8 to 11 in an exploded perspective illustration of individual parts, and FIG. 13 shows the insertable element from FIGS. 8 to 12 inserted in an insertion opening, in a side view.

DETAILED DESCRIPTION OF THE PREFERRED EMBODIMENTS

Figure 3:
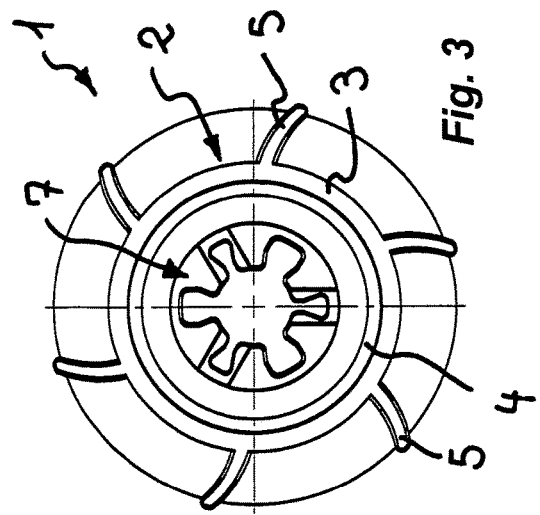
FIG. 3 shows the insertable element from FIGS. 1 and 2 in a plan view of the outflow side thereof.
Figure 4:
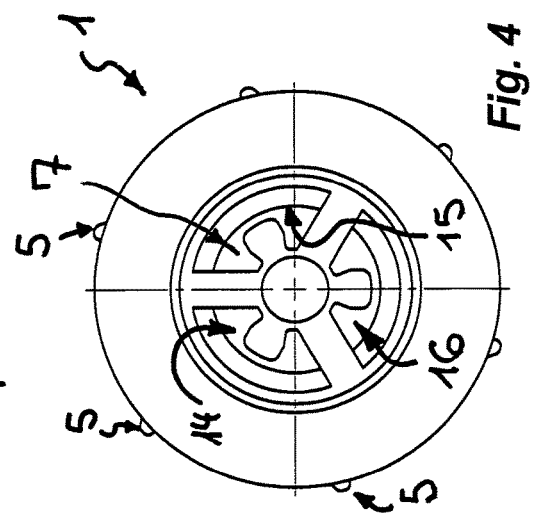
FIG. 4 shows the insertable element from FIGS. 1 to 3 in a plan view of the inflow side thereof.
Figure 2:
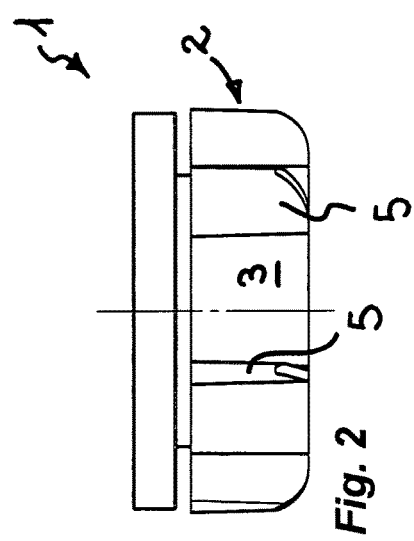
FIG. 2 shows the insertable element from FIG. 1 in a side view.
Figure 1:
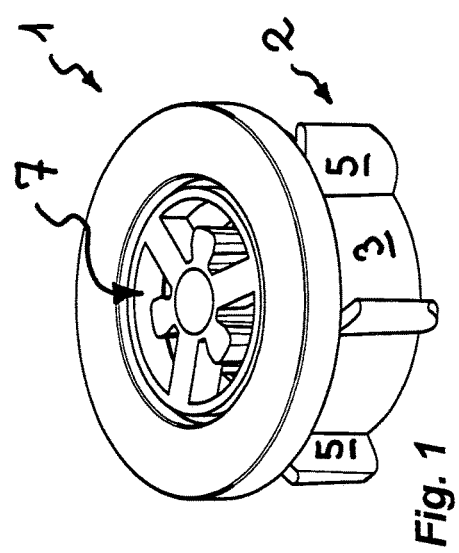
FIG. 1 shows an insertable plumbing element, which is shown in a perspective plan view of the inflow side and which can be inserted by means of a sleeve-shaped insertion plug into an end-located insertion opening of a plumbing pipe section, wherein a plurality of retaining fins, which here have a bent fin cross section, project from the outer circumference of the insertable element.
Figure 5:
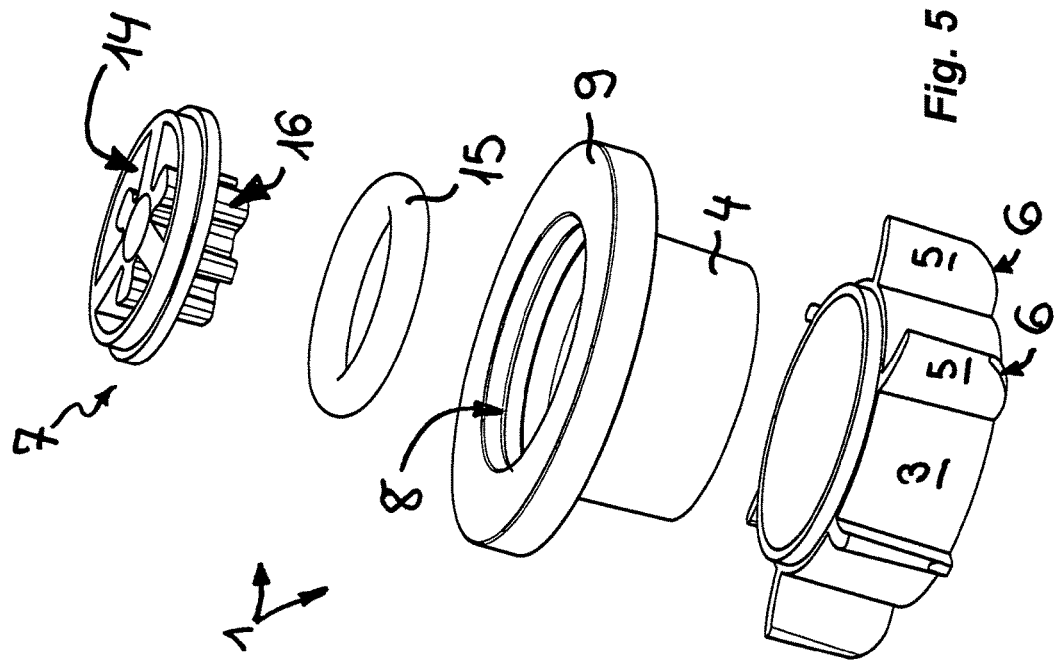
FIG. 5 shows the insertable element from FIGS. 1 to 4 in an exploded perspective illustration of individual parts.
Figure 6:
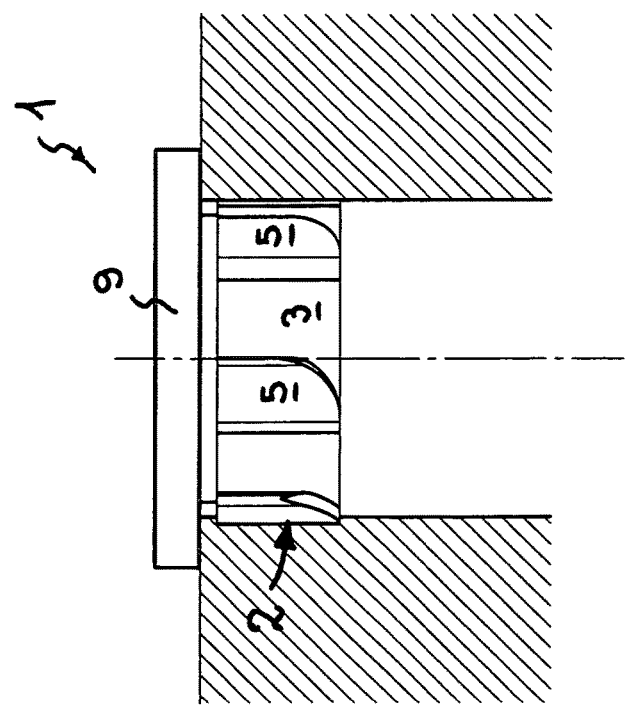
FIG. 6 shows the insertable element from FIGS. 1 to 5 inserted in an insertion opening, in a side view.

FIGS. 1 to 7 and 8 to 13 show two different embodiments of an insertable plumbing element 1. The insertable element 1 has a sleeve-shaped insertion plug 2, by means of which the insertable element 1 can be inserted into an end-located insertion opening in a plumbing pipe section. This insertion plug 2 has, at least on the outer circumference, an outer layer 3 of elastic material for securing it by frictional engagement in the insertion opening. In order to sufficiently reinforce, in a direction transverse to the plug longitudinal axis of the insertion plug 2, even a relatively thin outer layer 3 that does not significantly impair the clear flow cross section through the sleeve-shaped insertion plug 2, especially at low pressures, so as to ensure that the elastic material of the outer layer 3 is pressed against the inner circumference of the pipe and the insertion plug 2 can be held there securely and firmly, a reinforcing sleeve 4, which is composed of a material that is inflexible in comparison with the outer layer and which is surrounded by the outer layer 3, is provided. This is because larger cross sections are required to achieve a greater flow in the low-pressure range. For this purpose, it is necessary to reduce the wall thickness of the sleeve-shaped insertion plug 2. In order to prevent the collapse of the outer layer 3, composed of elastic material, of the insertion plug 2 as said plug is pressed in and in order to ensure the desired contact pressure of the outer layer on the inner circumferential side of the pipe section in the region of the end-located insertion opening, a reinforcing sleeve 4, which is surrounded by the outer layer 3, is provided in the insertion plug 2. By virtue of the reinforcing sleeve 4, sufficient pressure of the insertion plug 2 on the inner circumference of the pipe section having the end-located insertion opening is ensured at all times.

As can be seen in FIGS. 1 to 13, at least one retaining fin 5 composed of elastic material is provided on the outer layer 3. The at least one retaining fin 5 projects beyond the insertion plug 2 transversely to the plug longitudinal axis. In order to ensure centering of the insertion plug 2 as the insertion plug 2 is inserted or pressed into the insertion opening, at least two and preferably more than two retaining fins 5 are provided on the insertable element 1, said fins being arranged in a manner distributed at uniform intervals in a circumferential direction of the insertion plug 2. Each of these retaining fins 5 has a bent fin cross section, wherein the fin cross sections of the retaining fins 5 are bent in the same circumferential direction.

To ensure that any deformation of the retaining fins 5 that is required in the same circumferential direction can be readily ensured as the insertion plug 2 and the retaining fins 5 thereof are pressed into the insertion opening, it is advantageous if that end edge region 6 of the at least one retaining fin 5 which is at the front in the insertion direction of the insertion plug 2 widens to an increasing extent in the insertion direction. By virtue of the end edge region 6 of the retaining fins 5 which widens to an increasing extent in the insertion direction, the insertion plug 2 can be readily pressed into a corresponding insertion opening without the need for the retaining fins 5 also to be deformed and fitted in an involved manual process.

Preferred embodiments of the insertable element 1 illustrated here envisage that a flow restrictor that reduces the flow or—as here—a flow rate regulator 7 is provided at least on one end region of the reinforcing sleeve 4 and preferably at least on the inflow-side end region thereof, said regulator having the task of regulating the flow volume flowing through per unit time to a pressure-independent defined flow value.

The reinforcing sleeve 4 of the insertable elements 1 illustrated here in FIGS. 1 to 7, on the one hand, and FIGS. 7 to 13, on the other hand, have a flow-restrictor or flow-rate-regulator receptacle 8, at least at their inflow-side end region, into which receptacle a flow restrictor or, in this case, the flow rate regulator 7 can be inserted. As will become clear from a comparison of FIGS. 1 to 13, the reinforcing sleeve 4 of the insertable elements 1 illustrated here has, at the inflow-side end thereof, an insertion stop 9 designed as a ring-shaped flange on the outer circumference.

The outer layer 3 and the reinforcing sleeve 4 can be produced as multi-component injection moldings. However, another simple method of producing the insertable element 1 according to the invention consists in pushing the outer layer 3 onto the reinforcing sleeve 4, which is produced separately from said layer.

Figure 7:
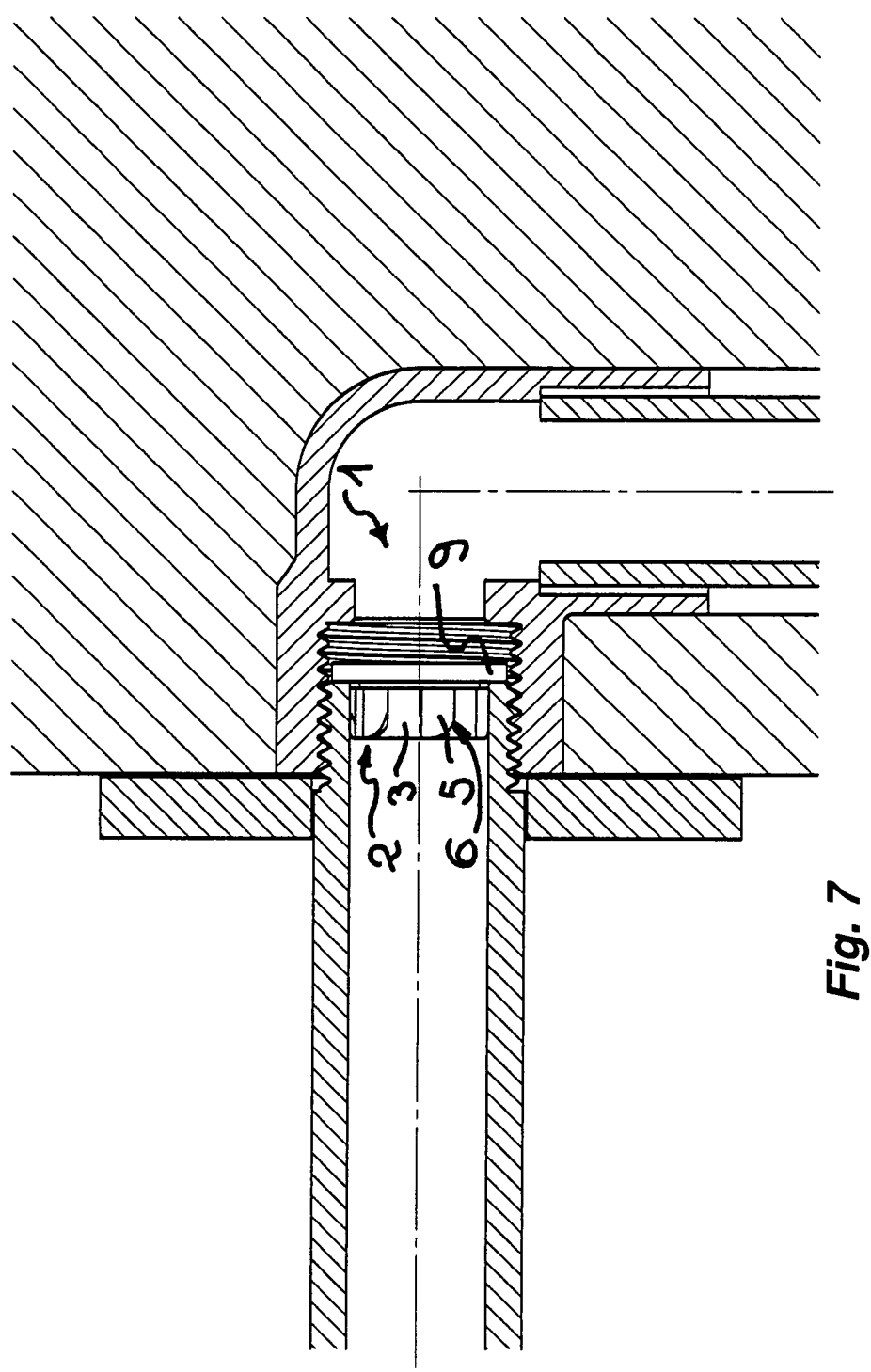
FIG. 7 shows the insertable element from FIGS. 1 to 6 in a typical installation situation.
Figure 10:
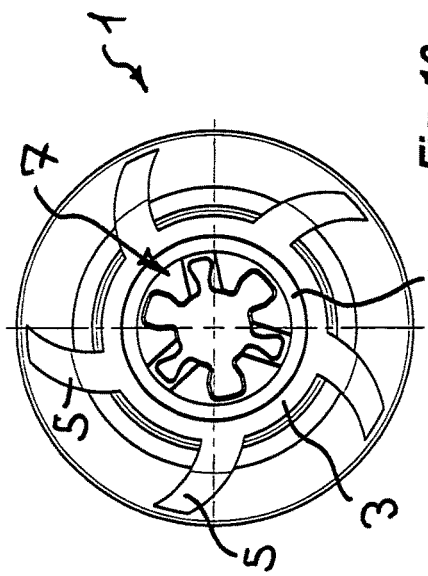
FIG. 10 shows the insertable element from FIGS. 8 and 9 in a plan view of the outflow side thereof.
Figure 11:
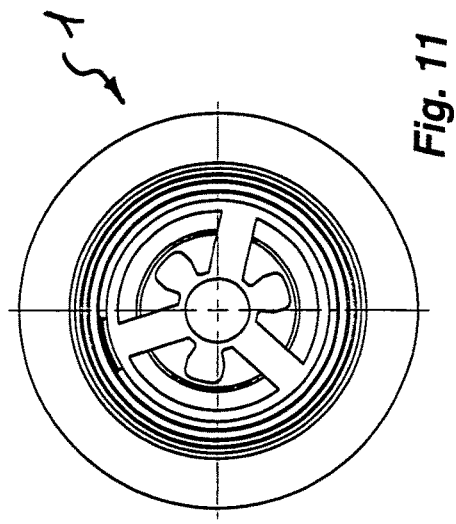
FIG. 11 shows the insertable element from FIGS. 8 to 10 in a plan view of the inflow side thereof.
Figure 9:
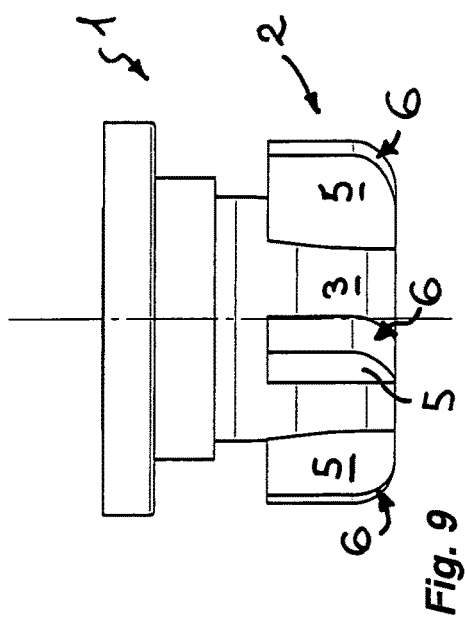
FIG. 9 shows the insertable element from FIG. 8 in a side view.
Figure 8:
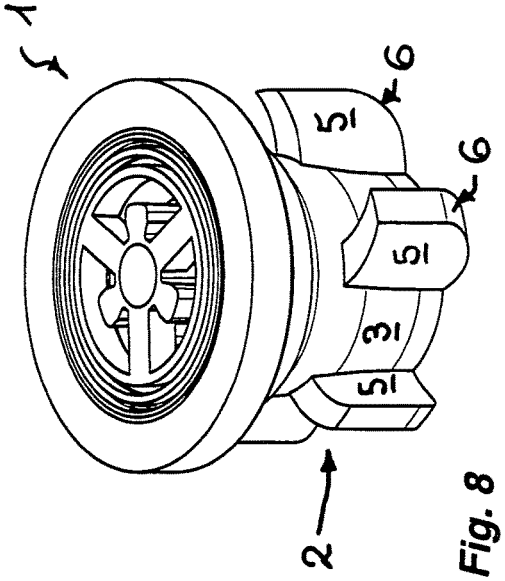
FIG. 8 shows another insertable plumbing element, which is likewise shown in a perspective plan view of the inflow side.

In the illustrative embodiment of the insertable element 1 shown in FIGS. 1 to 7, the outer layer 3 surrounds the reinforcing sleeve 4 up to the insertion stop 9 thereof, which serves as a ring-shaped flange. In this embodiment, the outer layer 3 serves to press and firmly hold the insertable element 1 shown in FIGS. 1 to 7 in the end-located insertion opening in a pipe section. In FIG. 7, a typical installation situation for an insertable element of this kind shown in FIGS. 1 to 7 in a wall-mounted shower arm is shown, said shower arm usually being sealed in the connection thread, with the result that there the insertion stop 9 serving as a ring-shaped flange cannot be clamped between two adjacent end edges of opposite pipe segments.

In the illustrative embodiment of the insertable element 1 shown in FIGS. 8 to 13, the outer layer 3 surrounds the reinforcing sleeve 4 beyond the insertion stop 9 thereof. In this case, the insertion stop 9 surrounded by the outer layer 3 is designed as a sealing ring, which can be clamped between adjacent ends of two interconnected pipe sections. For this purpose, one end region of the outer layer 3 is designed as a ring-shaped flange 12 formed by two ring-shaped zones 10, 11 connected to one another at the edges. The ring-shaped zones 10, 11 of said ring-shaped flange 12 are connected at the outer circumferential edge thereof and enclose the insertion stop 9 of the reinforcing sleeve 4 between them. In this case, the illustrative embodiment of the insertable element 1 shown in FIGS. 8 to 13 can additionally also ensure elastomeric sealing in the axial direction. The illustrative embodiment shown in FIGS. 8 to 13 is therefore preferably used in handheld shower attachments or in union nut joints because it already contains the required axial seal as an integral component.

Here, the flow rate regulators used in the insertable elements 1 shown in FIGS. 1 to 13 have a regulator housing 13 in which at least one ring-shaped channel 14 is provided. Inserted into this ring-shaped channel 14 of the flow rate regulators 7 is a ring-shaped restrictor element 15 composed of elastic material, which bounds a control gap between itself and a regulating profile 16 provided on the inner and/or the outer channel wall, said gap being variable by means of the restrictor element 15, which is deformed under the pressure of the fluid flowing through.

LIST OF REFERENCE SIGNS 1 insertable plumbing element
2 insertion plug
3 outer layer
4 reinforcing sleeve
5 retaining fin
6 end edge region
7 flow rate regulator
8 flow-rate-regulator receptacle
9 insertion stop
10 ring-shaped zone
11 ring-shaped zone
12 ring-shaped flange
13 regulator housing
14 ring-shaped channel
15 restriction element
16 regulating profile

The invention claimed is:

1. An insertable plumbing element (1) that is insertable, into an end-located insertion opening in a plumbing pipe section, the insertable plumbing element (1) comprising:
   an insertion plug (2) including, at least on an outer circumference, an outer layer (3) of elastic material adapted for frictional engagement in the insertion opening,
   a reinforcing sleeve (4), made of a material that is inflexible in comparison with the outer layer and which is surrounded by the outer layer (3), that reinforces the outer layer (3) transversely to a plug longitudinal axis; and
   a flow restrictor or a flow rate regulator (7) at least on one end region of the reinforcing sleeve (4).

2. The insertable plumbing element as claimed in claim 1, wherein at least one retaining fin (5) comprised of elastic material is held on the outer layer (3), said fin (5) projecting beyond the insertion plug (2) transversely to the plug longitudinal axis.

3. The insertable plumbing element as claimed in claim 2, wherein at least two of the retaining fins (5) project from the outer layer (3), said fins being arranged in a manner distributed in a circumferential direction of the insertion plug (2).

4. The insertable plumbing element as claimed in claim 2, wherein the at least one retaining fin (5) has a bent fin cross section.

5. The insertable plumbing element as claimed in claim 4, wherein the fin cross sections of the retaining fins (5) are bent in a same circumferential direction.

6. The insertable plumbing element as claimed in claim 1, wherein an end edge region (6) of the at least one retaining fin (5) which is at a front in an insertion direction of the insertion plug (2) widens to an increasing extent in the insertion direction.

7. The insertable plumbing element as claimed in claim 1, wherein the reinforcing sleeve (4) has a flow-restrictor or flow-rate-regulator receptacle (8), at least at an inflow-side end region, into which receptacle the flow restrictor or the flow rate regulator (7) is inserted.

8. The insertable plumbing element as claimed in claim 1, wherein the reinforcing sleeve (4) has at one end thereof an insertion stop (9) designed as a ring-shaped flange on an outer circumference.

9. The insertable plumbing element as claimed in claim 1, wherein the outer layer (3) and the reinforcing sleeve (4) are produced as two- or multi-component injection moldings.

10. The insertable plumbing element as claimed in claim 1, wherein the outer layer (3) is pushed onto the reinforcing sleeve (4), which is produced separately from said layer.

11. The insertable plumbing element as claimed in claim 8, wherein the outer layer (3) surrounds the reinforcing sleeve (4) up to the insertion stop (9) thereof.

12. The insertable plumbing element as claimed in claim 8, wherein the outer layer (3) surrounds the reinforcing sleeve (4) beyond the insertion stop (9) thereof and the insertion stop (9) surrounded by the outer layer (3) is designed as a sealing ring.

13. The insertable plumbing element as claimed in claim 12, wherein an end region of the outer layer (3) is designed as a ring-shaped flange (12) formed by two ring-shaped zones connected to one another at edges thereof, and ring-shaped zones (10, 11), which are connected at an outer circumferential edge thereof, enclose the insertion stop (9) of the reinforcing sleeve (4) between them.

14. The insertable plumbing element as claimed in claim 1, wherein the flow rate regulator (7) has a regulator housing (13) having at least one ring-shaped channel (14), in said channel (14) a ring-shaped restrictor element (15) composed of elastic material is provided, which bounds a control gap between itself and a regulating profile (16) provided on at least one of an inner or an outer channel wall, said gap being variable by the restrictor element (15), which is deformed under pressure of the fluid flowing through.

* * * * *